United States Patent
Inoue

(10) Patent No.: US 9,319,438 B2
(45) Date of Patent: Apr. 19, 2016

(54) COMMUNICATION TERMINAL THAT PERFORMS NETWORK PACKET COMMUNICATION USING SIP SERVERS, CONTROL METHOD FOR THE COMMUNICATION TERMINAL, AND STORAGE MEDIUM

(75) Inventor: Go Inoue, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 125 days.

(21) Appl. No.: 13/255,666

(22) PCT Filed: Jun. 21, 2011

(86) PCT No.: PCT/JP2011/064616
§ 371 (c)(1),
(2), (4) Date: Sep. 9, 2011

(87) PCT Pub. No.: WO2012/005129
PCT Pub. Date: Jan. 12, 2012

(65) Prior Publication Data
US 2012/0106542 A1    May 3, 2012

(30) Foreign Application Priority Data

Jul. 6, 2010    (JP) .................................. 2010-153815

(51) Int. Cl.
*H04L 12/28* (2006.01)
*H04L 29/06* (2006.01)
(Continued)

(52) U.S. Cl.
CPC ........ *H04L 65/1059* (2013.01); *H04L 41/0806* (2013.01); *H04L 65/1006* (2013.01);
(Continued)

(58) Field of Classification Search
CPC .................. H04L 29/06027; H04L 29/12216; H04L 41/0809; H04L 65/1006; H04L 65/1069; H04L 65/608
USPC .......................................... 370/351–356, 389
See application file for complete search history.

(56) References Cited

U.S. PATENT DOCUMENTS 7,233,980 B1 *  6/2007  Holden ............. H04L 29/06027
                                                         379/265.01
7,639,676 B2 * 12/2009  Nishida ............... H04L 65/1006
                                                         370/353

(Continued)

FOREIGN PATENT DOCUMENTS

| JP | 2008033558 A | 2/2008 |
| JP | 2009171104 A | 7/2009 |

(Continued)

OTHER PUBLICATIONS

WIPO Publication-Non English version_WO2008/0787798 A1.*

(Continued)

*Primary Examiner* — Khaled Kassim
*Assistant Examiner* — Berhanu Belete
(74) *Attorney, Agent, or Firm* — Rossi, Kimms & McDowell LLP

(57) ABSTRACT

A communication terminal that determines the types of SIP servers, and stores SIP server information in association with the determined types so that SIP communication can be normally performed. The communication terminal carries out network packet communication using the SIP servers. SIP server information on the SIP servers is acquired, and types of the SIP servers are determined based on the acquired SIP server information. The SIP server information is stored in association with the determined types of the SIP servers.

8 Claims, 10 Drawing Sheets

(51) Int. Cl.
*H04L 12/24* (2006.01)
*H04L 29/08* (2006.01)
*H04L 29/12* (2006.01)

(52) U.S. Cl.
CPC .......... *H04L65/1046* (2013.01); *H04L 67/303* (2013.01); *H04L 29/12226* (2013.01); *H04L 61/2015* (2013.01)

(56) References Cited

U.S. PATENT DOCUMENTS

| | | | | | |
|---|---|---|---|---|---|
| 8,331,349 | B2* | 12/2012 | Torii | ................. | H04M 3/42272 370/352 |
| 2003/0046404 | A1* | 3/2003 | O'Neill | ............. | H04L 29/12009 709/228 |
| 2003/0046405 | A1* | 3/2003 | O'Neill | .................. | H04L 29/06 709/228 |
| 2003/0092444 | A1* | 5/2003 | Sengodan | ............ | H04W 12/08 455/436 |
| 2003/0236892 | A1* | 12/2003 | Coulombe | .......... | H04L 67/2823 709/228 |
| 2004/0105420 | A1* | 6/2004 | Takeda | ............. | H04L 29/12066 370/349 |
| 2004/0105433 | A1* | 6/2004 | Seo | ................... | H04L 29/06027 370/352 |
| 2004/0233898 | A1* | 11/2004 | Otsuka | ................... | H04L 29/06 370/352 |
| 2004/0248600 | A1* | 12/2004 | Kim | ...................... | H04L 12/581 455/466 |
| 2005/0213591 | A1* | 9/2005 | Nakazawa | .............. | H04L 12/64 370/401 |
| 2005/0216595 | A1* | 9/2005 | Miyata | .................. | H04L 12/581 709/227 |
| 2005/0286496 | A1* | 12/2005 | Malhotra | .......... | H04L 29/06027 370/352 |
| 2006/0078096 | A1* | 4/2006 | Poyhonen | ......... | H04L 29/06027 379/88.12 |
| 2006/0120344 | A1* | 6/2006 | Yamaguchi | ....... | H04L 29/06027 370/351 |
| 2006/0133356 | A1* | 6/2006 | Suzukawa | ......... | H04L 29/06027 370/352 |
| 2006/0242300 | A1* | 10/2006 | Yumoto | ............ | H04L 29/06027 709/226 |
| 2006/0271664 | A1* | 11/2006 | Ono | .................. | H04L 29/06027 709/223 |
| 2007/0019658 | A1* | 1/2007 | Park | .................. | H04L 29/06027 370/410 |
| 2007/0043872 | A1* | 2/2007 | Pattan | ................ | H04L 29/06027 709/227 |
| 2007/0127447 | A1* | 6/2007 | Cho | .................. | H04L 29/06027 370/356 |
| 2007/0136413 | A1* | 6/2007 | Ishikawa | ........... | H04L 29/06027 709/200 |
| 2007/0177548 | A1* | 8/2007 | Oyama | ................. | H04L 65/1046 370/331 |
| 2007/0268896 | A1* | 11/2007 | Oyama | ................... | H04L 12/24 370/389 |
| 2007/0286163 | A1* | 12/2007 | Oka | .................... | H04L 65/1069 370/352 |
| 2008/0013534 | A1* | 1/2008 | Tsuzuki | .................. | H04L 45/00 370/389 |
| 2008/0089349 | A1* | 4/2008 | Tanimoto | .............. | H04L 65/105 370/401 |
| 2008/0095158 | A1* | 4/2008 | Nakazawa et al. | ............ | 370/389 |
| 2008/0118043 | A1* | 5/2008 | Kawaguchi | ............. | H04L 65/80 379/93.14 |
| 2008/0151296 | A1* | 6/2008 | Watanabe | .......... | H04N 1/00217 358/1.15 |
| 2008/0155250 | A1* | 6/2008 | Tanizawa | .................. | H04L 9/32 713/152 |
| 2008/0171564 | A1* | 7/2008 | Tanizawa | ............... | H04L 67/145 455/466 |
| 2008/0175251 | A1* | 7/2008 | Ooucchi | .................... | H04L 45/04 370/395.31 |
| 2008/0218584 | A1* | 9/2008 | Matsumoto | ............ | H04N 7/152 348/14.09 |
| 2008/0240085 | A1* | 10/2008 | Yoshizawa | ............... | H04W 8/02 370/352 |
| 2008/0244709 | A1* | 10/2008 | George | ............... | H04L 65/1006 726/4 |
| 2008/0256224 | A1* | 10/2008 | Kaji | .................. | H04L 65/1046 709/223 |
| 2009/0092131 | A1* | 4/2009 | Hu | ...................... | H04L 65/1006 370/356 |
| 2009/0109963 | A1* | 4/2009 | Tanizawa | ................ | H04L 12/66 370/352 |
| 2009/0187664 | A1* | 7/2009 | Boucadair | ......... | H04L 29/06027 709/228 |
| 2009/0219859 | A1* | 9/2009 | Fukushima | ....... | H04M 3/42382 370/328 |
| 2009/0245113 | A1* | 10/2009 | Kamiya | .................. | H04L 65/80 370/238 |
| 2009/0262724 | A1* | 10/2009 | Suzuki | ................ | H04L 67/1095 370/352 |
| 2009/0296693 | A1* | 12/2009 | Ebisawa | .............. | H04L 12/66 370/352 |
| 2010/0074100 | A1* | 3/2010 | Suzuki | ................ | G06F 11/2025 370/221 |
| 2010/0329271 | A1* | 12/2010 | Murakami | .......... | H04L 65/1006 370/401 |
| 2011/0044210 | A1* | 2/2011 | Yokota | .................. | H04W 76/02 370/259 |
| 2011/0196948 | A1* | 8/2011 | Yamauchi | ............... | H04M 3/54 709/222 |
| 2011/0216759 | A1* | 9/2011 | Qian | .................... | H04L 65/1063 370/352 |

FOREIGN PATENT DOCUMENTS

JP  2010147788 A  7/2010
WO  WO 2008078798 A1 *  7/2008

OTHER PUBLICATIONS

WO2008/0787998_MachineTranslation.pdf.*

* cited by examiner

FIG.6

```
IP HEADER PART
UDP HEADER PART
DHCP OPTION PART
    Option: 51 (IP address least time)
DHCP OPTION PART
    Option: 15 (Domain Name list)
DHCP OPTION PART
    Option: 120 (SIP Servers)
    Length: 12
    IP address: 172.16.0.1
    IP address: 172.16.0.2
    IP address: 172.16.0.3
DHCP OPTION PART
    Option: 3 (Router)
```

FIG.8

```
OPTIONS sip:aaa@aaa.bbb.com SIP/2.0
Via: SIP/2.0/UDP pc33.bbb.com;branch=z9hG4bKhjhs8ass877
Max-Forwards: 70
To: <sip:aaa@aaa.bbb.com>
From: Alice <sip:alice@bbb.com>;tag=1928301774
Call-ID: a84b4c76e66710
CSeq: 63104 OPTIONS
Contact: <sip:alice@bbb.com>
Accept: application/sdp
Content-Length: 0
```

FIG.9

```
SIP/2.0 200 OK
Via: SIP/2.0/UDP pc33.bbb.com;branch=z9hG4bKhjhs8ass877
;received=172.16.0.1
To: <sip:aaa@aaa.bbb.com>;tag=93810874
From: Alice <sip:alice@bbb.com>;tag=1928301774
Call-ID: a84b4c76e66710
CSeq: 63104 OPTIONS
Contact: <sip:aaa@aaa.bbb.com>
Contact: <mailto:aaa@aaa.bbb.com>
Allow: INVITE, ACK, CANCEL, OPTIONS, BYE, REGISTER, REFER
Accept: application/sdp
Accept-Encoding: gzip
Accept-Language: en
Supported: foo
Content-Type: application/sdp
Content-Length: 274
```

FIG. 11

| TYPE | CONTENT | DESCRIPTION |
|---|---|---|
| 1xx | PROVISIONAL RESPONSE | REQUEST IN PROCESSING |
| 2xx | SUCCESSFUL | PROCESSING ON REQUEST SUCCESSFULLY ENDS |
| 3xx | REDIRECT | REDIRECTION REQUIRED |
| 4xx | CLIENT ERROR | CLIENT-CAUSED ERROR, RETRY POSSIBLE |
| 5xx | SERVER ERROR | SERVER-CAUSED ERROR, RETRY POSSIBLE |
| 6xx | GLOBAL ERROR | RETRY-IMPOSSIBLE ERROR |

COMMUNICATION TERMINAL THAT PERFORMS NETWORK PACKET COMMUNICATION USING SIP SERVERS, CONTROL METHOD FOR THE COMMUNICATION TERMINAL, AND STORAGE MEDIUM

This application is a U.S. National Phase Application of PCT International Application PCT/JP2011/064616 filed on Jun. 21, 2011 which is based on and claims priority from JP2010-153815 filed on Jul. 6, 2010 the contents of which is incorporated herein in its entirety by reference.

TECHNICAL FIELD

The present invention relates to a communication terminal that performs network packet communication using SIP servers, a control method for the communication terminal, and a storage medium storing a program for executing the method.

BACKGROUND ART

In recent years, wide-area Ethernet (registered trademark) and IP-VPN (internet protocol-virtual private network) have been becoming increasingly advanced and widespread, and environments where WAN (wide-area network) is realized by an IP network in place of a conventional dedicated line or ATM (asynchronous transfer mode) have been increasing. Accordingly, voice service, which has conventionally been realized by PSTN (public switched telephone network) using PBX (private branch exchange), has come to be realized by VoIP using VoIP (voice over IP) gateway or a VoIP adapter. In particular, SIP (session initiation protocol) based on text descriptions with a high affinity for HTTP (Hypertext Transfer Protocol) has becoming more common as a signaling protocol for realizing voice service using VoIP as compared to H.323 whose data structure is complicated.

In SIP environments, SIP servers are commonly placed with an SIP terminal, and SIP servers offer functions such as registration and name resolution of an SIP server address, and call routing. SIP servers may be placed in a public network of an ISP (Internet service provider), or placed in a private network of a company.

SIP servers are broadly classified into three types according to functions. The first SIP server is an SIP registration server that carries out registration and name resolution of an SIP server address. The second SIP server is an SIP proxy server that acts as an alternative to an SIP terminal to carry out SIP communication with an opposite SIP terminal and a VoIP gateway. The third SIP server is an SIP redirect server that sends back an opposite destination that carries out call routing suitable for an SIP terminal. There is known a network system in which these SIP servers are placed separately for individual functions (see, for example, PTL (Patent Literature) 1).

When different SIP servers are placed for different functions, a normal response cannot be obtained from an SIP server unless an appropriate SIP message (an SIP message suitable for the type of the SIP server) is transmitted from an SIP terminal to an appropriate server. For example, an error is caused by transmission of a message requesting the start of SIP communication to an SIP registration server, and also, an error is caused by transmission of a message registering an SIP server address to an SIP proxy server. For this reason, SIP communication may not be carried out unless appropriate SIP server settings are configured at an SIP terminal.

If settings including the types of SIP servers are manually configured, the above problem can be avoided because appropriate SIP servers can be manually set one by one.

CITATION LIST

Patent Literature

{PTL 1} Japanese Laid-Open Patent Publication (Kokai) No. 2008-033558

SUMMARY OF INVENTION

Technical Problem

As described above, when settings including types of SIP servers are manually configured, a lot of time and effort are required for a user. On the other hand, it is known that SIP server information is automatically acquired using DHCP (dynamic host configuration protocol) or DHCPv6 as defined by RFC 3361 or the like. Further, it is known that SIP server information is automatically acquired using multicast searches or broadcast searches.

However, when SIP server information is automatically acquired, no information is added to the types of SIP servers. For this reason, the types of retrieved SIP servers cannot be determined, and erroneous SIP messages (SIP messages unsuitable for the types of the SIP servers) may be transmitted to the SIP servers.

The present invention provides a communication terminal that determines the types of SIP servers, and stores SIP server information in association with the determined types so that SIP communication can be normally performed, a control method for the communication terminal, and a storage medium storing a program for implementing the method.

Solution to Problem

Accordingly, a first aspect of the present invention provides a communication terminal that carries out network packet communication using SIP servers, comprising an acquisition unit that acquires SIP server information on the SIP servers, a determination unit that determines types of the SIP servers based on the SIP server information acquired by the acquisition unit, and a storage unit that stores the SIP server information acquired by the acquisition unit in association with the types of the SIP servers determined by the determination unit.

Accordingly, a second aspect of the present invention provides a control method for a communication terminal that carries out network packet communication using SIP servers, comprising an acquisition step of acquiring SIP server information on the SIP server, a determination step of determining types of the SIP servers based on the SIP server information acquired in the acquisition step, and a storage step of storing, in a storage unit, the SIP server information acquired in the acquisition step in association with the types of the SIP servers determined in the determination step.

Accordingly, a third aspect of the present invention provides A non-transitory computer-readable storage medium storing a program for causing a computer to implement a control method for a communication terminal as described above.

Advantageous Effects of Invention

According to the present invention, because types of SIP servers are determined, and SIP server information is stored in association with the determined types, SIP communication can be normally performed.

The features and advantages of the invention will become more apparent from the following detailed description taken in conjunction with the accompanying drawings.

BRIEF DESCRIPTION OF DRAWINGS

FIG. 6 is a diagram showing an exemplary DHCP reply packet in a case where the SIP server information automatic acquisition unit has successfully acquired SIP server information using DHCPv4;

FIG. 8 is a diagram showing an exemplary body part of a transmitted packet of an OPTIONS method, which is transmitted by an SIP server information determination unit;

FIG. 9 is a diagram showing an exemplary body part of a response packet to the transmitted packet shown in FIG. 8;

FIG. 11 is a diagram showing exemplary SIP response codes used in the SIP information determination process.

DESCRIPTION OF EMBODIMENTS

The present invention will now be described in detail with reference to the drawings showing an embodiment thereof.

Figure 1:
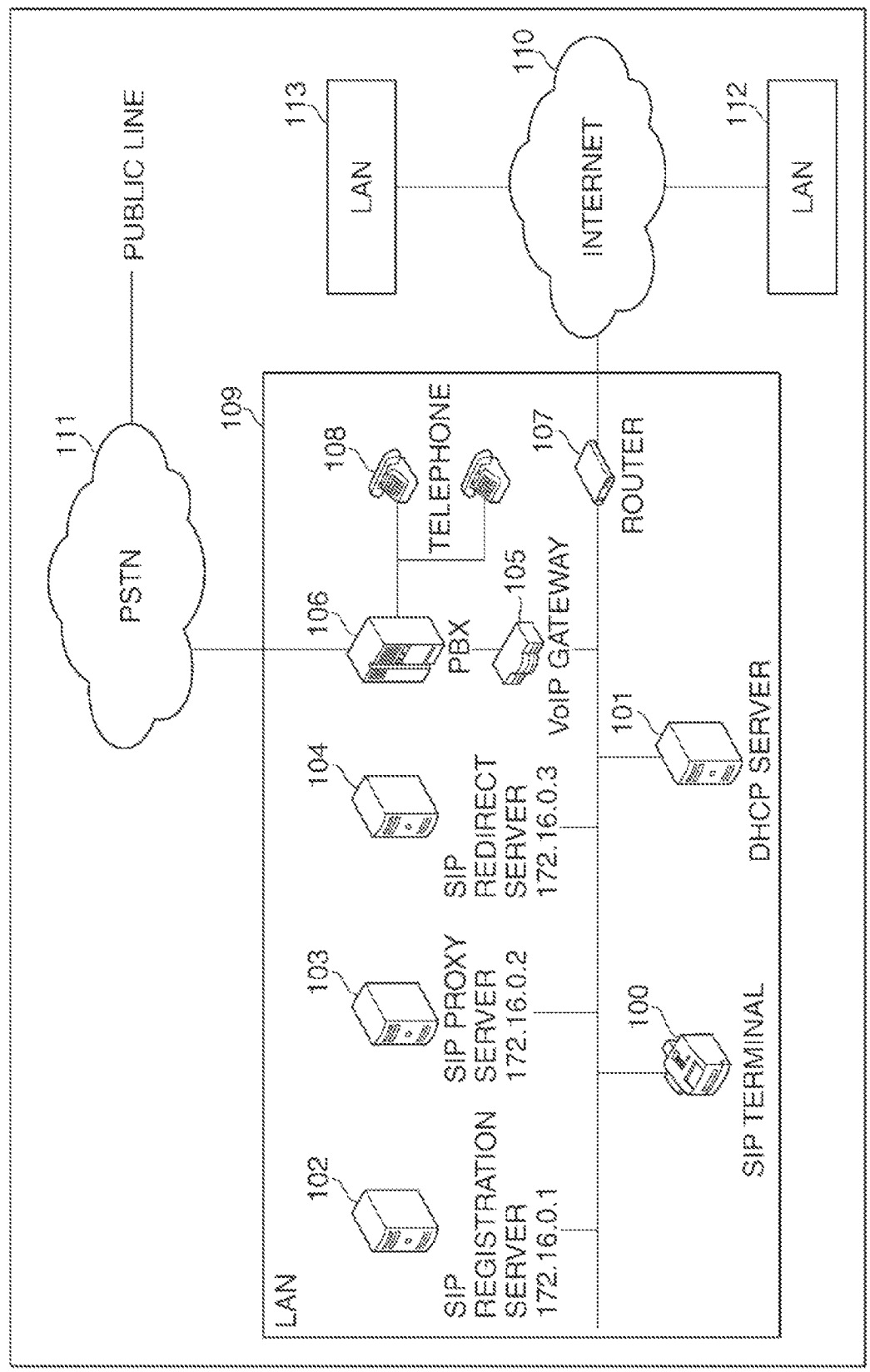
FIG. 1 is a block diagram schematically showing an arrangement of an SIP communication network system according to an embodiment of the present invention.

FIG. 1 is a block diagram schematically showing an SIP communication network system according to an embodiment of the present invention. An SIP terminal 100, which is a communication terminal connected to a first LAN (local area network) 109 constituting the SIP communication network system, has an SIP call control function. The DHCP server 101 has at least a function of supporting at least an option 120, and distributing SIP server information. It should be noted that the "options 120" is a standard relating to SIP servers managed by the IRNA (internet assigned numbers authority).

An SIP registration server 102 accepts a process for registration of an SIP server address or the like from the SIP terminal 100. An SIP proxy server 103 acting as a proxy for the SIP terminal 100 to perform SIP call control with SIP terminal at the other end (not shown). An SIP redirect server 104 receives requests from the SIP terminal 100, and provides notification about an address of the opposite SIP terminal.

A VoIP gateway 105 converts IP packets into analog voice data. A PBX 106, which is a private branch exchange, is connected to an analog telephone 108 and others, and also connected to a public line via a PSTN 111. The LAN 109 is connected to the Internet 110 via a router 107, and connected to other LANs such as a second LAN 112 and a third LAN 113 via the Internet 110. The IP packets can be communicated between the LAN 109 and the Internet 110 via the router 107.

Figure 2:
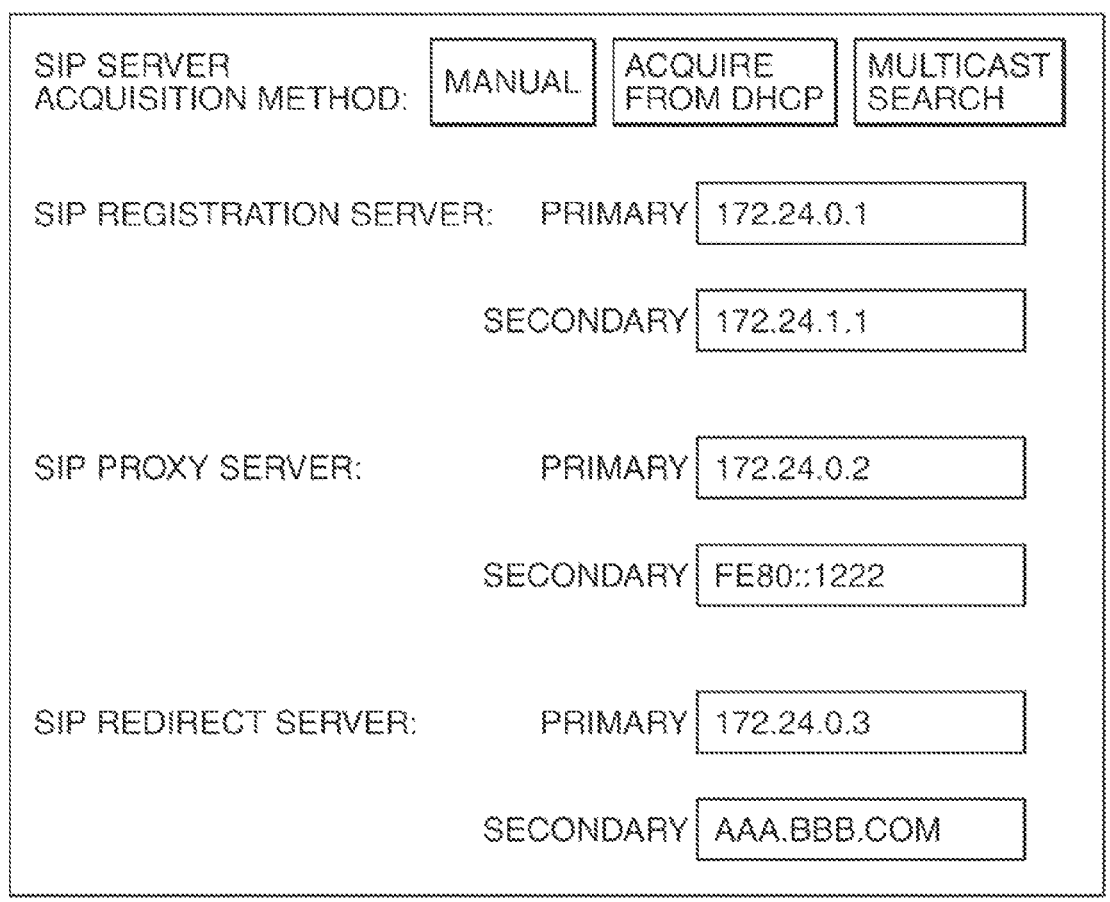
FIG. 2 is a diagram schematically showing an exemplary UI for acquiring and setting SIP sever information at an SIP terminal.

FIG. 2 is a diagram schematically showing an exemplary UI (user interface) for acquiring and setting SIP sever information at the SIP terminal 100. In "SIP server acquisition method" in FIG. 2, a user can select any one of "manual acquisition" that SIP server information is manually set, "acquisition from DHCP" that SIP server information is acquired from the DHCP server 101, and "multicast search" that a multicast search is performed.

As SIP servers, three types of servers consisting of an SIP registration server, an SIP proxy server, and an SIP redirect server can be set. For each server, a primary and a secondary can be set, and each of them can be set in the form of an IPv4 address, an IPv6 address, a host name, an SIP address, or the like.

When "manual" is selected in "SIP server acquisition method", the user manually types values in address fields for each server, and the input can be done via an operation panel 309 (see FIG. 3), to be described later. On the other hand, when "acquisition from DHCP" or "multicast search" is selected, automatic acquisition of SIP server information is performed at the time of startup, and acquired SIP server information is stored.

Figure 3:
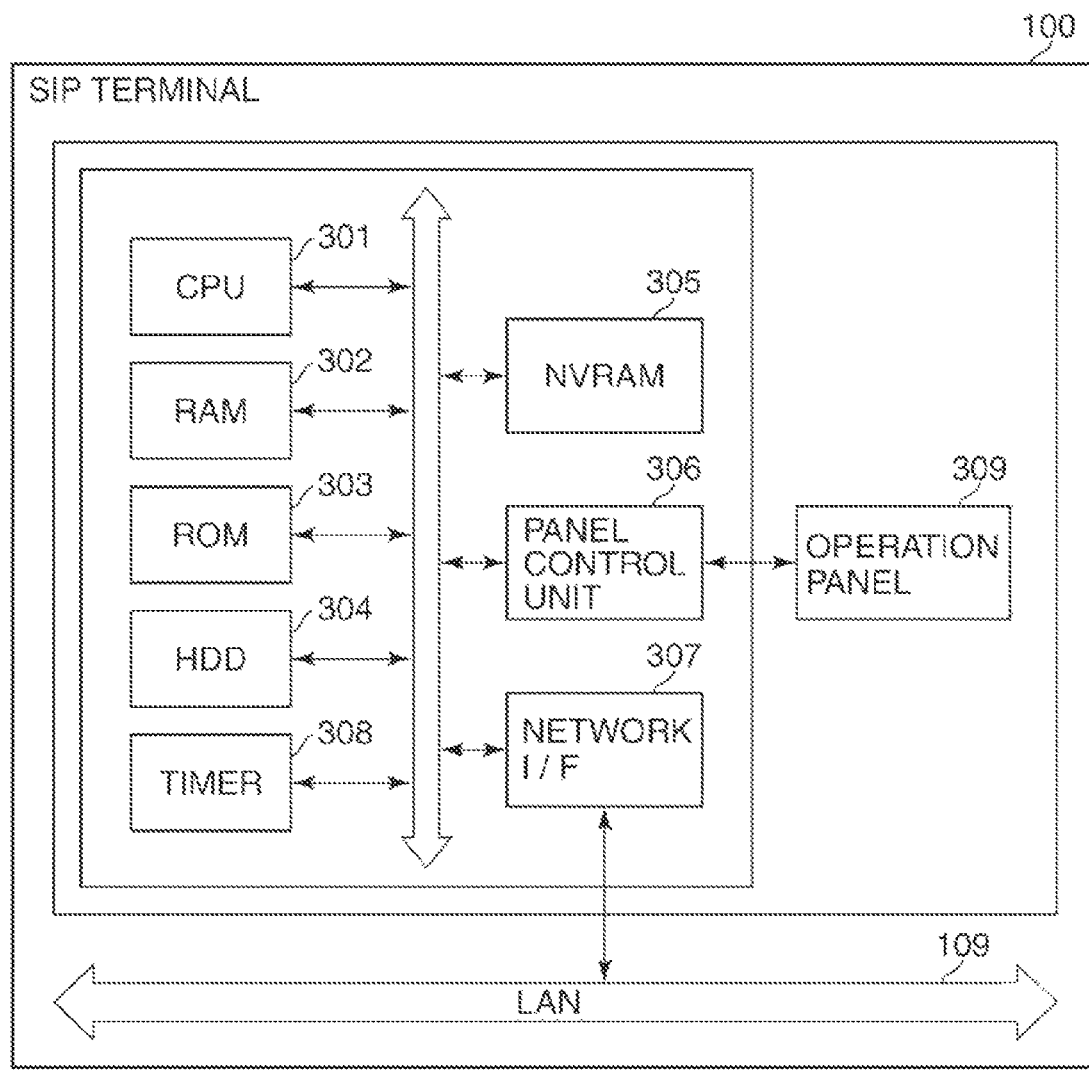
FIG. 3 is a block diagram schematically showing a hardware arrangement of the SIP terminal.

FIG. 3 is a block diagram schematically showing a hardware arrangement of the SIP terminal 100. A CPU 301 executes software programs for the SIP communication network system, and controls the entire SIP terminal 100. A RAM 302 is used for temporary data storage when the CPU 301 controls the apparatus. A ROM 303 stores a boot program, fixed parameters, and so on for the SIP terminal 100. An HDD 304 stores various data and programs. It should be noted that the HDD 304 is merely an example of a storage device, and any other storage device (for example, a flash memory or a DVD-RAM) may be used instead.

A timer 308 manages elapsed time in timer processing. An NVRAM 305 stores various setting values for the SIP communication network system such as information relating to SIP. A panel control unit 306 controls the operation panel 309 to input instruction from a user to display various information. It should be noted that the screen in FIG. 2 for acquiring and setting SIP server information is displayed on the operation panel 309, and the user may confirm set SIP server information via the display on the operation panel 309. A network I/F unit 307 carries out network packet communication via the LAN 109.

Figure 4:
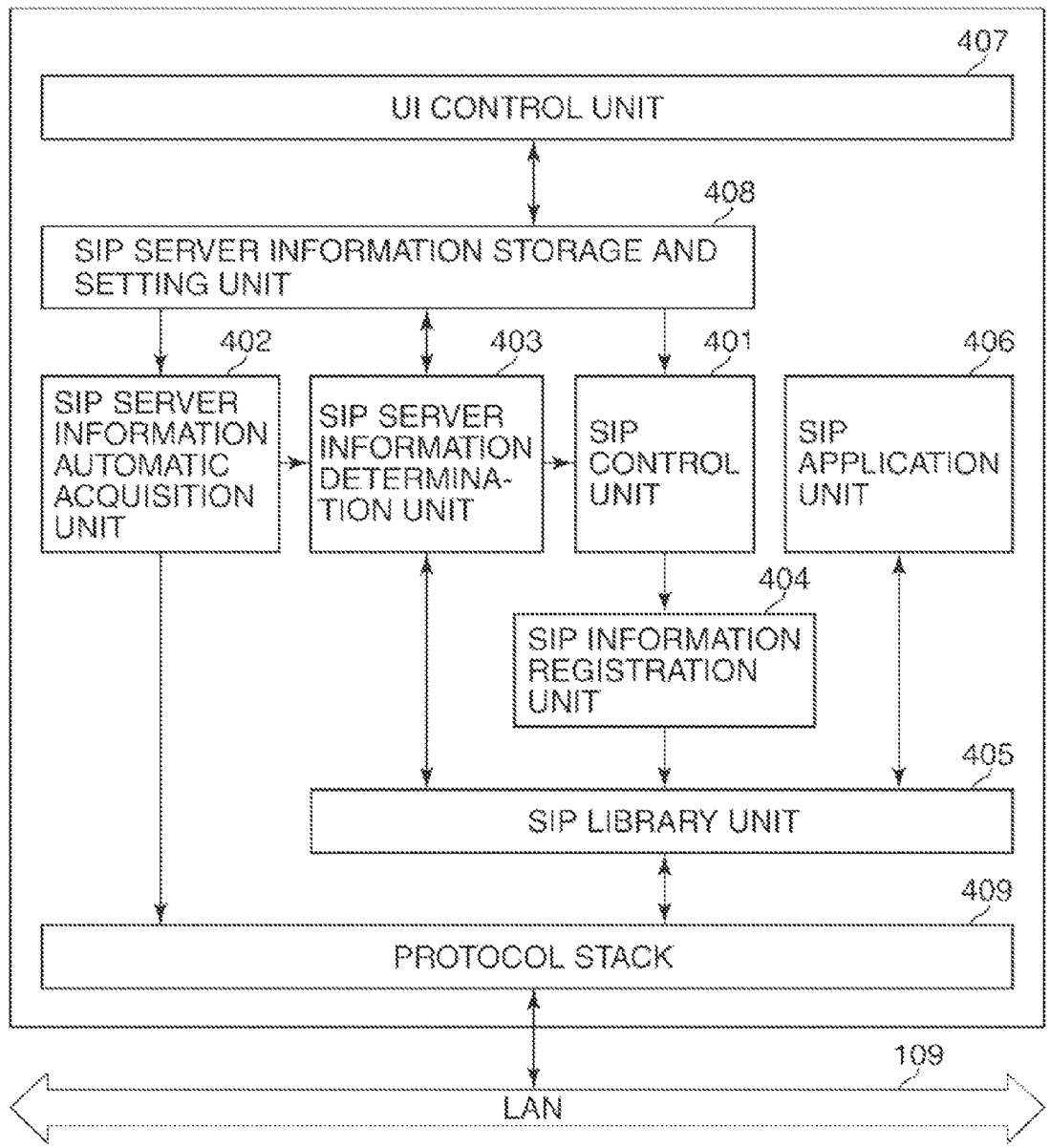
FIG. 4 is a block diagram schematically showing a software arrangement of the SIP terminal.

FIG. 4 is a block diagram schematically showing a software arrangement of the SIP terminal 100. Functions of components shown in FIG. 4 are realized by the CPU 301 performing computations based on predetermined programs stored in the ROM 303 and so on or data stored in the HDD 304, the NVRAM 305, and so on, and operating various hardware constituting the SIP terminal 100.

An SIP control unit 401 provides overall control relating to SIP communication such as creation and interpretation of SIP messages. An SIP server information automatic acquisition unit 402 automatically acquires SIP server information via the LAN 109 using DHCPv4 and DHCPv6, or acquires SIP server information by transmitting a multicast packet or a broadcast packet via the LAN 109. An SIP server information determination unit 403 receives SIP server information from the SIP server information automatic acquisition unit 402 to determine the types of SIP servers, and stores appropriate SIP server information in an SIP server information storage and setting unit 408 in association with the types of the SIP servers, and notifies the SIP control unit 401 of the same.

An SIP information registration unit 404 carries out a process to register information on the SIP terminal 100 in the SIP registration server 102. An SIP library unit 405 offers a library for an SIP application unit 406 to realize SIP communications. The SIP application unit 406 is a group of applications realized on SIP, and examples of the applications include SIP-FAX, IP phone, and SIP printing.

An UI control unit 407 stores SIP server information set via the UI by the user in the SIP server information storage and setting unit 408, and notifies the SIP control unit 401 of the same. The SIP server information storage and setting unit 408 stores SIP server information acquired by the SIP server information determination unit 403 or acquired via the UI, and sets the SIP server information in the SIP terminal 100. A protocol stack 409 controls IP and TCP/UDP in the SIP communication network system, and acts as a NIC control unit that controls a NIC (network interface card) that carries out network packet communication via the LAN 109.

Figure 5:
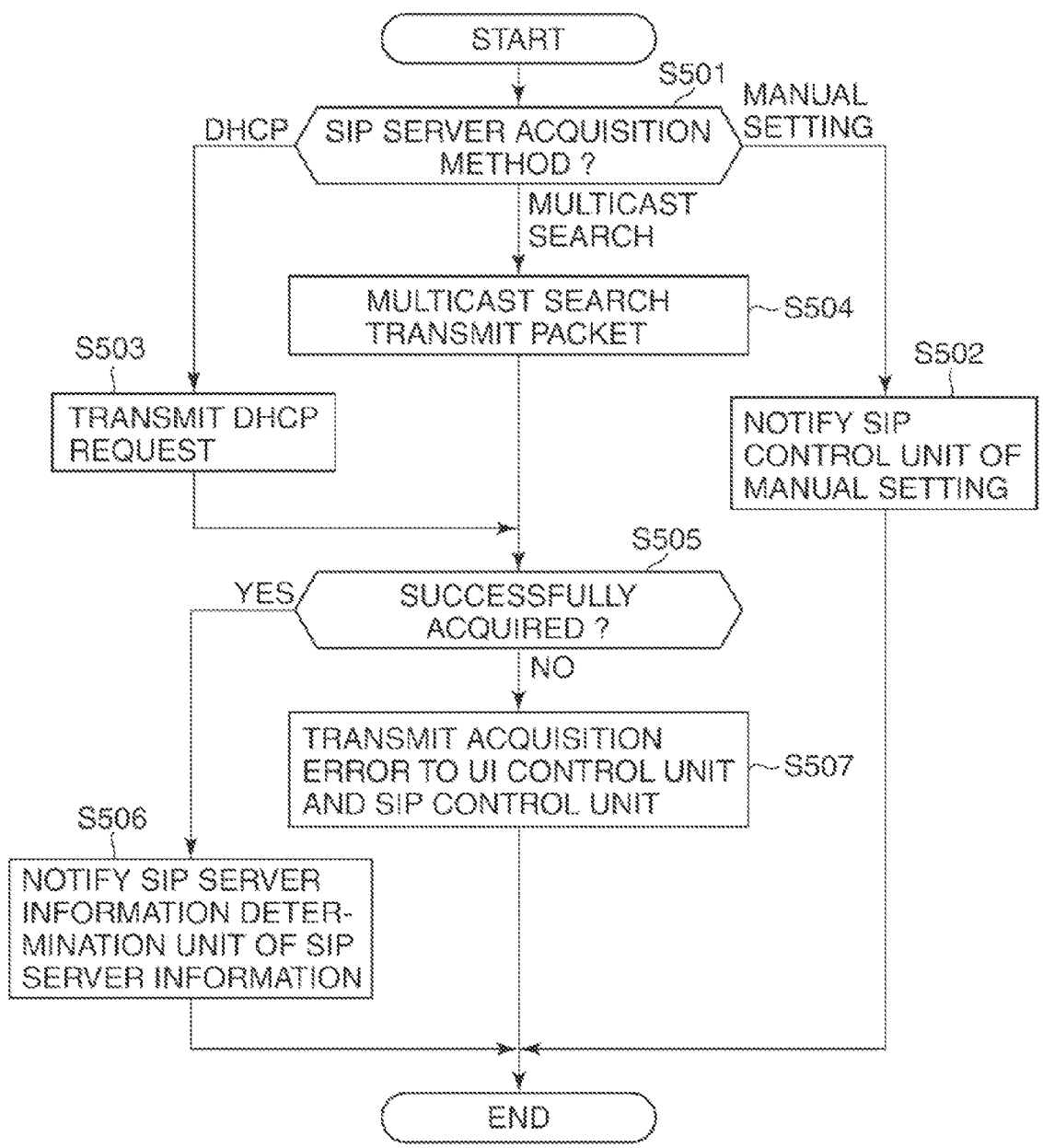
FIG. 5 is a flowchart of an SIP information acquisition process carried out by an SIP server information automatic acquisition unit.

FIG. 5 is a flowchart of an SIP server information acquisition process carried out by the SIP server information automatic acquisition unit 402. When the SIP terminal 100 is started, the SIP server information automatic acquisition unit 402 determines how to acquire SIP server information from SIP server information acquisition settings (step S501). It should be noted that the SIP server information acquisition settings are configured in advance via the operation panel 309 by the user, and stored in the NVRAM 305 (or the HDD 304) in accordance with FIG. 2.

When in the step S501, it is determined that SIP server information is to be manually acquired, the SIP server information automatic acquisition unit 402 notifies the SIP control unit 401 to that effect (step S502), and then terminates the process. It should be noted that the SIP control unit 401 displays, on the operation panel 309, the screen in FIG. 2 for acquiring and setting SIP server information, and prompts the user to set SIP server information.

When in the step S501, it is determined that SIP server information is to be acquired from DHCP, the SIP server information automatic acquisition unit 402 transmits a DHCP request including the option 120 to the DHCP server 101 (step S503). Then, the SIP server information automatic acquisition unit 402 interprets a DHCP response which is response data to the DHCP request, and determines whether or not SIP server information has been successfully acquired (step S505).

When, for example, there is no response from the DHCP server 101, or error information is included in the DHCP response, it is determined that the SIP server information has not been successfully acquired ("NO" in the step S505). In this case, the SIP server information automatic acquisition unit 402 notifies the SIP control unit 401 and the UI control unit 407 of unsuccessful acquisition (step S507). Upon receiving the notification of unsuccessful acquisition, the UI control unit 407 displays a message saying that "SIP server information has not been successfully acquired", which is not shown, on the operation panel 309 to notify the user to that effect. Then, the process is terminated.

When SIP server information has been successfully acquired ("YES" in the step S505), the SIP server information automatic acquisition unit 402 notifies the SIP information determination unit 403 of the SIP server information (step S506), and then terminates the process. FIG. 6 shows an exemplary DHCP reply packet in a case where the SIP server information has been successfully acquired using DHCPv4. According to the DHCP reply packet shown in the figure, three lists (IP addresses) have been acquired as SIP servers, but the types of the SIP servers are not defined. A description will be given later of how the types of the SIP servers are defined by the SIP server information determination unit 403.

When in the step S501, it is determined that SIP server information is to be acquired using a multicast search, the SIP server information automatic acquisition unit 402 transmits a multicast packet for searching an SIP server (step S504). It is then determined whether or not SIP server information has been successfully acquired (step S505). When there is no response to the multicast packet or when SIP server information has not been successfully acquired ("NO" in the step S505), the same error processing as in the case of acquisition from DHCP is carried out (step S507). When SIP server information has been successfully acquired ("YES" in the step S505), the same success processing as in the case of acquisition from DHCP is carried out (step S506).

The above described process may be carried out for not only the option 120 but any information as long as the information relates to SIP servers. DHCP includes DHCPv4 and DHCPv6, and the present embodiment may be applied to both protocols. Multicast packets include IPv4 and IPv6 multicast packets, and the present embodiment may be applied to both protocols.

Figure 7:
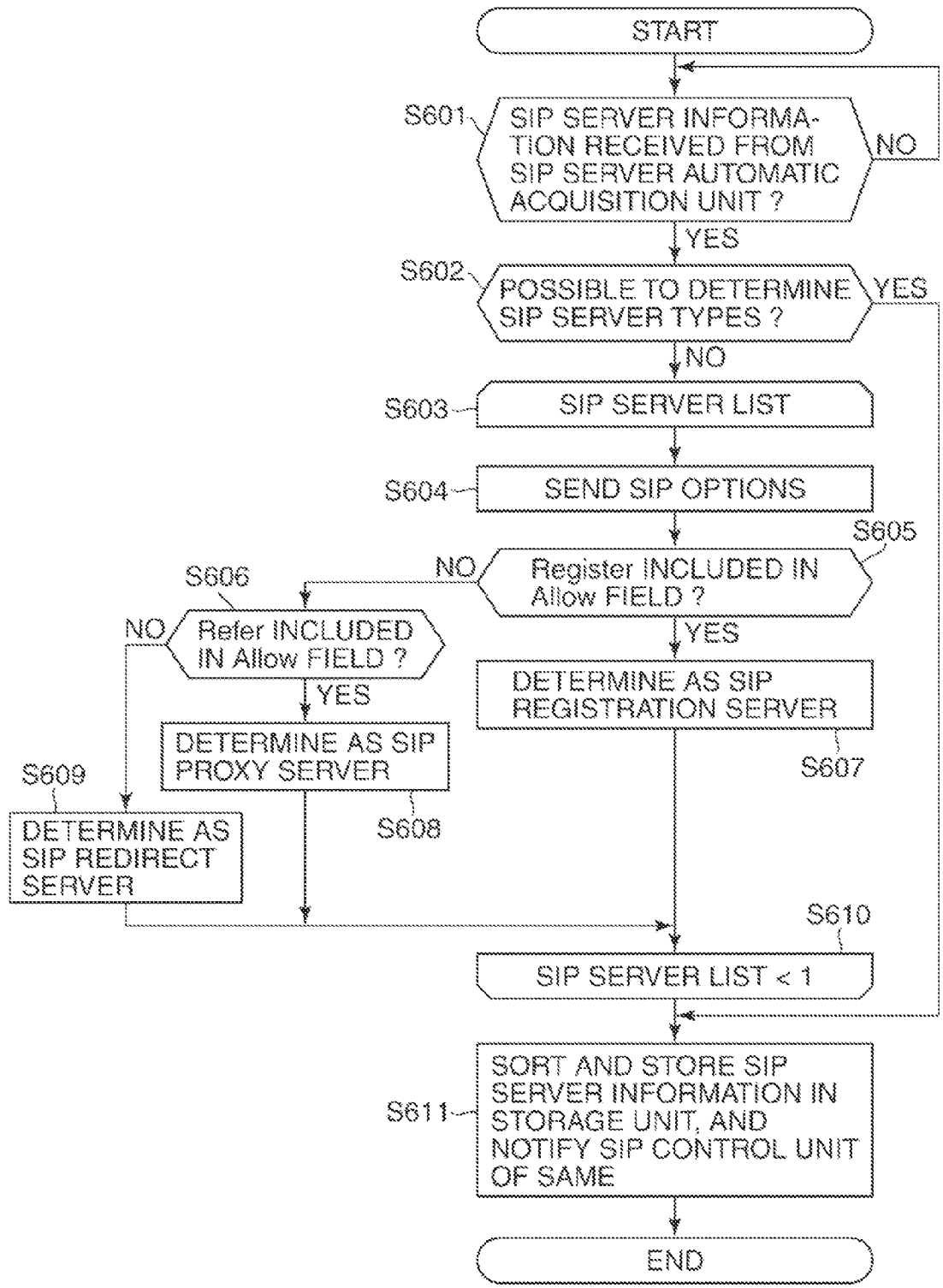
FIG. 7 is a flowchart of an SIP information determination process according to a first embodiment, which is carried out by an SIP server information determination unit.

FIG. 7 is a flowchart of an SIP information determination process according to a first embodiment, which is carried out by the SIP server information determination unit 403. The SIP server information determination unit 403 determines whether or not it has been notified of SIP server information by the SIP server information automatic acquisition unit 402 (step S601), and waits until it is notified of SIP server information ("NO" in the step S601). When notified of SIP server information ("YES" in the step S601), the SIP server information determination unit 403 determines whether or not the types of SIP servers can be determined from the SIP server information (step S602).

When the types of SIP servers can be determined from the SIP server information ("YES" in the step S602), the SIP server information determination unit 403 stores information on the types of SIP servers and address information in the SIP server information storage and setting unit 408, and notifies the SIP control unit 401 of the same (step S611). As a result, the SIP server information is set in the SIP terminal 100, and appropriate SIP server information is set in the UI in FIG. 2, so that the user can confirm the set SIP server information via the UI.

When the types of the SIP servers cannot be determined ("NO" in the step S602), and an SIP server information list as shown in FIG. 6 is posted (step S603), the SIP server information determination unit 403 cannot determine the types of the SIP servers from contents of the SIP server information list. Thus, to determine the types of the SIP servers, the SIP server information determination unit 403 transmits an OPTIONS method, which is one of SIP methods, to each of the SIP servers on the list (step S604).

FIG. 8 is a diagram showing an exemplary body part of a transmitted packet of the OPTIONS method transmitted by the SIP server information determination unit 403. OPTIONS is stored in a Cseq field, and an SIP server address or a host name posted from the SIP server information automatic acquisition unit 402 is stored in a TO field. Formats of other fields comply with RFC standards for SIP.

FIG. 9 is a diagram showing an exemplary body part of a response packet to the transmitted packet shown in FIG. 8. A list of SIP methods supported by the concerned SIP server is stored in an Allow field. In the example shown in FIG. 9, SIP methods Invite, Ack, Bye, OPTIONS, Cancel, Refer, and Register are supported. The SIP server information determination unit 403 determines the types of the SIP servers from these fields.

After the step S604, it is determined whether or not the Register method is included in the Allow field (step S605). When the Register method is included in the Allow field ("YES" in the step S605), the concerned SIP server acts as an SIP registration server, and it is thus determined that the concerned SIP server is an SIP registration server (step S607). Then, the process proceeds to perform processing on the next SIP server list, and when there is no SIP server list (step S610), the process proceeds to step S611.

When the Register method is not included in the Allow field ("NO" in the step S605), it is determined whether or not the Refer method is included in the Allow field (step S606). When the Refer method is included in the Allow field ("YES" in the step S606), the SIP server acts as an SIP proxy server, and it is thus determined that the concerned SIP server is an SIP proxy server (step S608). When the Refer method is not included in the Allow field ("NO" in the step S606), it is determined that the concerned SIP server is an SIP redirect server (step S609). After the steps S608 and S609, the process proceeds to perform processing on the next SIP server list, and when there is no SIP server list (step S610), the process proceeds to the step S611.

After the types of all the SIP servers posted in the step S603 have been determined, the SIP server information determination unit 403 stores information on SIP server addresses and types in the SIP server information storage and setting unit 408, and notifies the SIP control unit 401 of the same (step S611). As a result, the SIP server information is set in the SIP terminal 100, and the UI in FIG. 2 is updated with appropriate SIP server information, so that the user can confirm the SIP server information set for each SIP server type via the UI.

It should be noted that when an upper limit to the number of SIP servers set in the SIP terminal 100 has been reached although types of all the SIP servers posted in the step S603 have not yet been determined, the SIP server type determination process may be brought to an end, and the process may proceed to the step S611.

According to the above described process, when SIP server information is to be automatically set, the SIP control unit 401 receives notification after the types of appropriate SIP servers have been determined. Moreover, as described earlier, when the user sets SIP server information via the UI control unit 407 in a case where SIP server information is to be manually set, the UI control unit 407 notifies the SIP control unit 401 of the set SIP server information.

In either the case where SIP server information is to be manually set or the case where SIP server information is to be automatically set, the SIP control unit 401 determines that SIP communications are possible after completion of notification to that effect, and starts the SIP information registration unit 404 and the SIP application unit 406, or provides them with notification that preparations for startup have been completed. As a result, the process for registering SIP server addresses transmitted by the SIP information registration unit 404 is successfully completed because the SIP server addresses are transmitted to the appropriate SIP registration server 102 in FIG. 1. Moreover, when the SIP application unit 406 requests SIP proxy communication, this request is transmitted to the SIP proxy server 103, and when the SIP application unit 406 requests redirect communication, this request is transmitted to the SIP redirect server 104. In this way, communication with appropriate SIP servers can be realized.

The SIP server type determination process described above has only to be carried out only once when the SIP terminal 100 is started, and does not have to be carried out each time an SIP message is transmitted, and thus there is no degradation in the performance of SIP transmission.

Although in the above description, the type of an SIP servers is determined when SIP server information is acquired, the type of an SIP server may be determined when an SIP message is transmitted. In this case, however, it may take time to transmit an SIP message, and this may cause degradation in the performance of transmission. On the other hand, if the type of an SIP server is determined when SIP server information is acquired as described above, degradation in the performance of transmission can be prevented.

Figure 10:
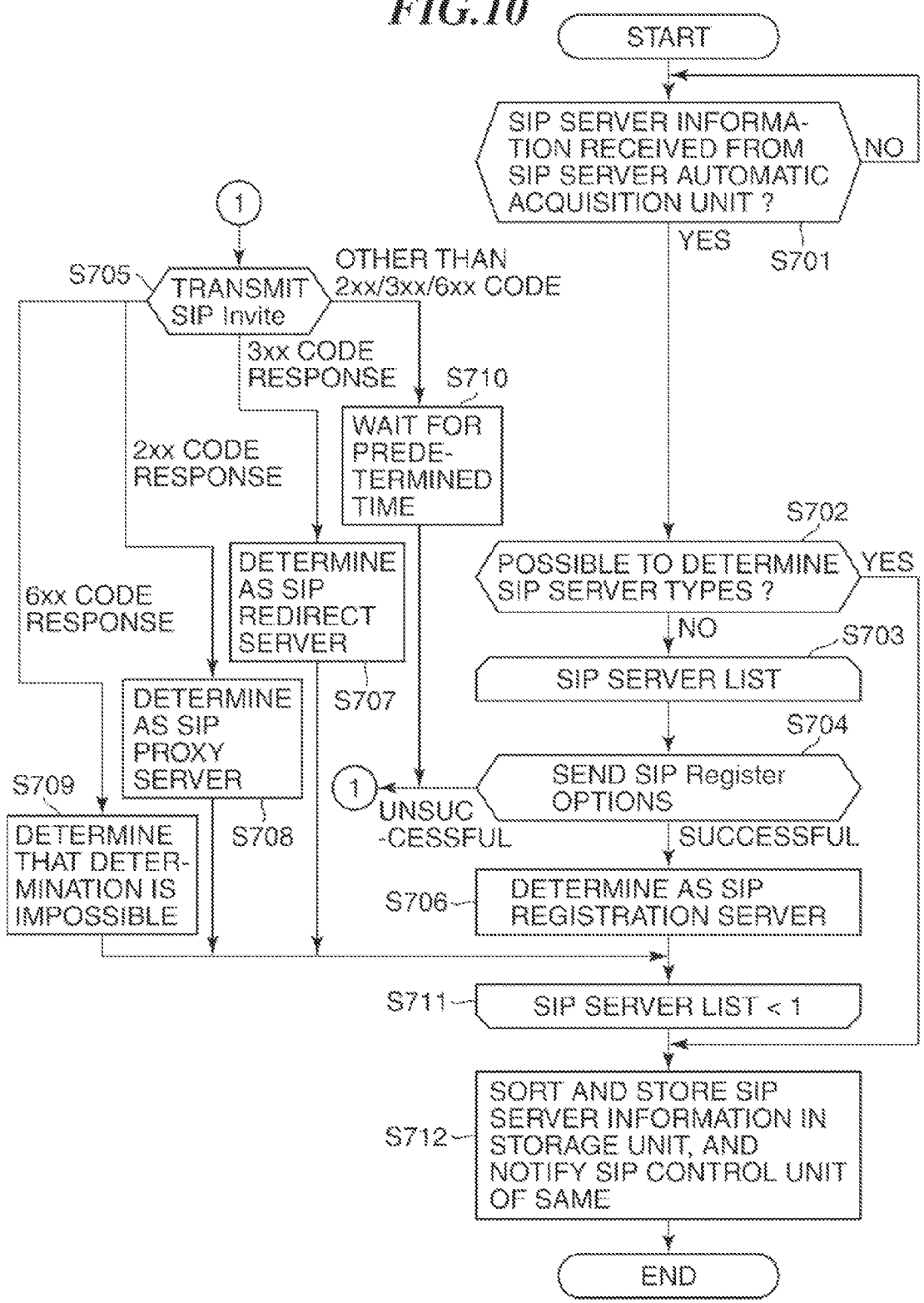
FIG. 10 is a flowchart of an SIP information determination process according to a second embodiment, which is carried out by the SIP server information determination unit.

According to a second embodiment, an SIP server information automatic acquisition method is the same as the method described above with reference to FIG. 5 showing the first embodiment, and therefore, description thereof is omitted here. FIG. 10 is a flowchart of an SIP information determination process according to the second embodiment, which is carried out by the SIP server information determination unit 403.

Although in the first embodiment, the type of an SIP server is determined using a response to the OPTIONS method, it is conceivable that there may be an invalid response or no response to the OPTIONS method, and thus the type of an SIP server may not be appropriately determined. For example, it is conceivable that there may be no response to OPTIONS when Register is included in the Allow field because the SIP server is an SIP registration server, or the SIP server may not respond to the OPTIONS method itself. The second embodiment relates to a determination method that can avoid the above described problems and appropriately determine the type of an SIP server.

In the second embodiment, the OPTIONS method, which is used in the first embodiment, is not used for determining the types of an SIP server. Processes in steps S701 to S703, S711, and S712 in FIG. 10 are the same as the steps S601 to S603, S610, and S611 in FIG. 10, and therefore, detailed description thereof is omitted here. Thus, detailed description will be now given of processes in steps S704 to S710.

After the process in the step S703, the SIP server information determination unit 403 transmits a Register method to a target SIP server (step S704). When the method in the step S704 is successful, it is determined that the SIP server is an SIP registration server (step S706). When the method in the step S704 is unsuccessful, an Invite method that stores an appropriate destination SIP server address is transmitted to the target SIP server (step S705).

When, as a result of the step S705, a response code of a response packet is in the 300s (3XX), it is determined that the SIP server is an SIP redirect server (step S707). On the other hand, when, as a result of the step S705, a response code of a response packet is in the 200s (2XX), It is determined that the concerned SIP server is an SIP proxy server (step S708).

However, when, as a result of the step S705, a response code of a response packet is in the 600s (6XX), the type of the SIP server cannot be determined. Therefore, the determination is terminated, and the process proceeds to perform processing on the next server list. When any response code other than the above-mentioned ones is received, the SIP server information determination unit 403 stands by for a predetermined period of time, and performs a retry (step S710).

FIG. 11 is a diagram showing exemplary SIP response codes, which are defined by RFC. After completion of the processes in the steps S706 to S709, the process proceeds to the step S711 and the subsequent steps as is the case with the first embodiment.

Although the embodiments of the present invention has been described by way of illustration, the present invention is not limited to the embodiments described above. For example, it is preferred that the user is allowed to selectively determine whether to practice the first embodiment or the second embodiment via a UI. Also, the first embodiment or the second embodiment may be practiced in combination suitably for a user network environment. In this case, weights may be assigned regarding which embodiment should be practiced first, which embodiment is given a higher priority in terms of practice result, and so on, and the user may be allowed to configure such settings.

Although in the above description of the embodiments, an SIP registration server, an SIP proxy server, and an SIP redirect server are given as examples of SIP server types, the present invention may be applied to any types of SIP servers such as an SIP location server. Regarding the type of an SIP server as well, the user may be allowed to select any desired type from a plurality of SIP servers, or newly register any desired type.

Automatic acquisition of SIP server information may be carried out only once when the SIP terminal 100 is started as in the first and second embodiments, or may be carried out at a time set by the user using the timer 308, or carried out at regular time intervals set in the timer 308. Further, any desired trigger such as the timing in which an SIP server address is changed may be set in advance by the user, and SIP server information may be automatically acquired in the timing in which the trigger occurs.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

REFERENCE SIGNS LIST

100 SIP terminal
102 SIP registration server
103 SIP proxy server
104 SIP redirect server
401 SIP control unit
402 SIP server information automatic acquisition unit
403 SIP server information determination unit
109 LAN

The invention claimed is:

1. A communication terminal that carries out network communication using a SIP server, comprising:
a reception unit that receives, via a network, a SIP server address of the SIP server;
a transmission unit that transmits a SIP method for inquiring about a type of a supported SIP method which the SIP server supports using the SIP server address received by said reception unit;
a determination unit that determines a type of the SIP server based on the type of the supported SIP method indicated in response data to the SIP method transmitted by the transmission unit, the type of the SIP server including at least one of a SIP registration server, a SIP proxy server, a SIP redirect server, and a SIP location server; and
a storing control unit that stores, into a memory of the communication terminal, the type of the SIP server determined by said determination unit in association with the SIP server address received by said reception unit,
wherein the determination unit determines the SIP registration server as the type of SIP server in a case where a Register method is indicted in the response data,
wherein the determination unit determines the SIP proxy server as the type of SIP server in a case where a Refer method is indicated in the response data, and
wherein the determination unit determines the SIP redirect server as the type of SIP server in a case where neither the Register method nor the Refer method is indicated in the response data.

2. A communication terminal as claimed in claim 1, wherein said reception unit uses DHCPv4 or DHCPv6 to receive the SIP server address.

3. A communication terminal as claimed in claim 1, wherein said reception unit uses a multicast packet or a broadcast packet to receive the SIP server address.

4. A communication terminal as claimed in claim 1, wherein said transmission unit transmits an OPTIONS method for inquiring about the type of the supported SIP method which the SIP server supports, and
wherein said determination unit determines the type of the SIP server based on the type of the supported SIP method indicated in an Allow field of the response data to the OPTIONS method.

5. A communication terminal as claimed in claim 1, wherein said reception unit automatically receives the SIP server address when the communication terminal is started.

6. A communication terminal as claimed in claim 1, wherein said reception unit automatically receives the SIP server address at regular time intervals set in advance by a user.

7. A control method for a communication terminal that carries out network communication using a SIP server, comprising:
a reception step of receiving, via a network, a SIP server address of the SIP server;
a transmission step of transmitting a SIP method for inquiring about a type of a supported SIP method which the SIP server supports using the SIP server address received in said reception step;
a determination step of determining a type of the SIP server based on the type of the supported SIP method indicated in response data to the SIP method transmitted in said transmission step, the type of the SIP server including at least one of a SIP registration server, a SIP proxy server, a SIP redirect server, and a SIP location server; and
a storage step of storing, into a memory of the communication terminal, the type of the SIP server determined in said determination step in association with the SIP server address received in said reception step,
wherein the determination step determines the SIP registration server as the type of SIP server in a case where a Register method is indicted in the response data, wherein the determination step determines the SIP proxy server as the type of SIP server in a case where a Refer method is indicated in the response data, and wherein the determination step determines the SIP redirect server as the type of SIP server in a case where neither the Register method nor the Refer method is indicated in the response data.

8. A non-transitory computer-readable storage medium storing a program for causing a computer to implement a control method for a communication terminal that carries out network communication using a SIP server, the control method comprising:

a reception step of receiving, via a network, a SIP server address of the SIP server;

a transmission step of transmitting a SIP method for inquiring about a type of a supported SIP method which the SIP server supports using the SIP server address received in said reception step;

a determination step of determining a type of the SIP server based on the type of the supported SIP method indicated in response data to the SIP method transmitted in said transmission step, the type of the SIP server including at least one of a SIP registration server, a SIP proxy server, a SIP redirect server, and a SIP location server; and a storage step of storing, into a memory of the communication terminal, the type of the SIP server determined in said determination step in association with the SIP server address received in said reception step, wherein the determination step determines the SIP registration server as the type of SIP server in a case where a Register method is indicted in the response data, wherein the determination step determines the SIP proxy server as the type of SIP server in a case where a Refer method is indicated in the response data, and wherein the determination step determines the SIP redirect server as the type of SIP server in a case where neither the Register method nor the Refer method is indicated in the response data.

\* \* \* \* \*